G. KAUPERT.
TESTING APPARATUS.
APPLICATION FILED OCT. 17, 1918.

1,306,066. Patented June 10, 1919.

Witness:
Leo. Dumais.

Inventor.
George Kaupert
by Robt. Klotz
Atty.

UNITED STATES PATENT OFFICE.

GEORGE KAUPERT, OF CHICAGO, ILLINOIS, ASSIGNOR OF ONE-HALF TO FRANK P. A'BRUNSWICK, AND ONE-HALF TO JOSEPHINE KAUPERT, BOTH OF CHICAGO, ILLINOIS.

TESTING APPARATUS.

1,306,066.   Specification of Letters Patent.   Patented June 10, 1919.

Application filed October 17, 1918. Serial No. 258,643.

*To all whom it may concern:*

Be it known that I, GEORGE KAUPERT, a subject of the Emperor of Germany, residing at Chicago, in the county of Cook and State of Illinois, have invented certain new and useful Improvements in Testing Apparatus, of which the following is a specification.

My invention relates to testing apparatus and has for its primary object the provision of a tester of improved construction and compact arrangement of parts whereby objects of various kinds built to receive and withstand great stresses may be accurately gaged as to their actual strength for the purpose intended. Another object is the provision of an improved form of tester by means of which the tensile strength of machinery belting may be tested.

Other objects and advantages of my invention will appear from the following description, taken in conjunction with the accompanying drawings which illustrate the preferred embodiment of the invention and form a part of this specification.

Figure 1:
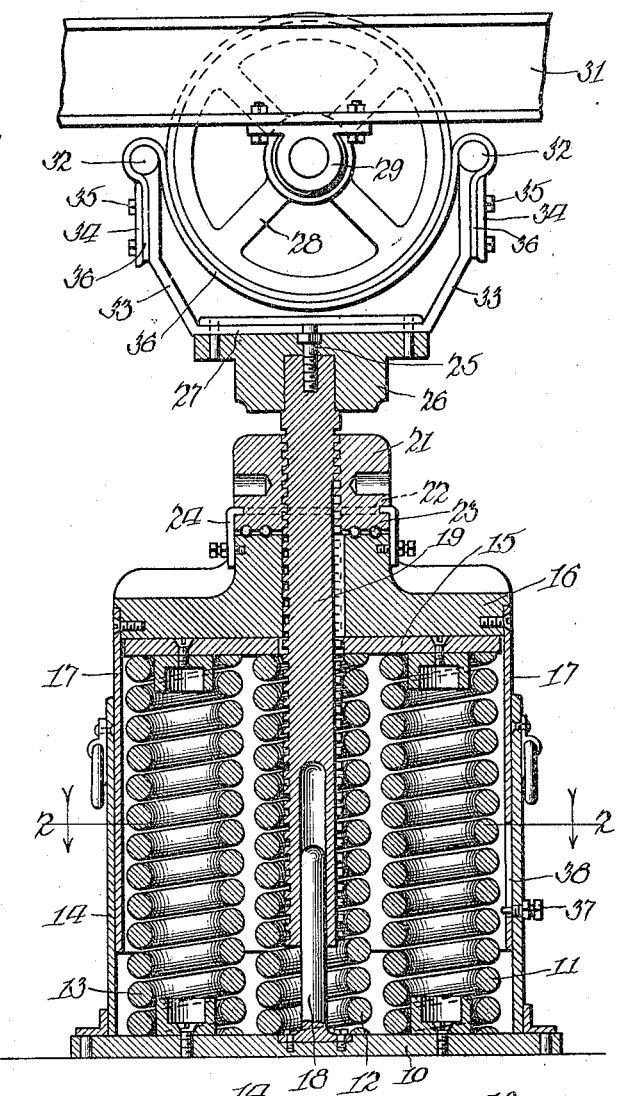
Figure 1 is a side elevation of that form of my invention adapted for the testing of machinery belts and pulleys, showing the lower portion thereof in vertical section on line 1—1 of Fig. 2.
Figure 2:
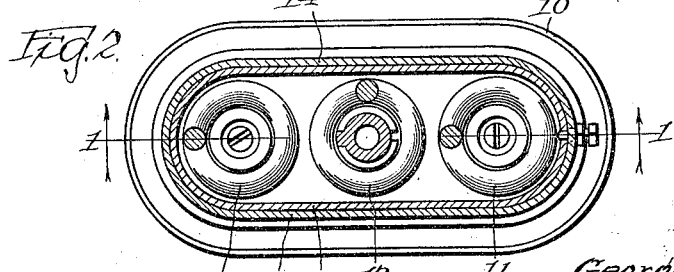
Fig. 2 is a horizontal section on line 2—2 of Fig. 1.

Referring to Figs. 1 and 2, reference numeral 10 indicates a base plate from which three heavy coiled springs rise vertically with their axes in a common plane, these springs being numbered respectively 11, 12 and 13. A lower casing section 14 surrounds these springs and rises to a point near their upper ends. A bed plate 15 rests upon the tops of springs 11, 12 and 13 and supports a cap 16 which is central above the axis of the middle spring 12. Depending into casing section 14 from the cap is an upper casing section 17 telescoping within the lower section 14 and guarding the operator from contact with the springs when they are under pressure.

A guide post 18 projects upwardly from base plate 10 and is received within and guides the vertical motion of a screw-threaded spindle 19 which is coaxial with the middle spring 12 and passes up through registering apertures provided in the bed plate 15 and cap 16. An operating nut 21, peripherally channeled as at 22, is threaded upon the spindle and, through the media of anti-friction elements 23, is supported upon the cap 16 for rotation, the spindle having no threaded connection with the cap. Retaining fingers 24 at each side of the cap have their upper ends bent inwardly into the channel 22, thus permitting the rotation of the nut while holding it against separation from the cap. Secured in any suitable manner, preferably by the bolt 25, is a pressure receiving head 26 fast upon the upper end of spindle 19, this head taking the thrust of objects being tested. A bifurcated frame 27 is fixed upon head 26 and has its arms upstanding therefrom and spaced apart slightly more than the distance across a testing wheel 28 journaled in bearings 29 carried by an I-beam 31, the wheel having its axis approximately in the same horizontal plane as the cylindrically shaped upper ends 32 of the arms 33 of the frame. By means of plates 34 and bolts 35 a length of belting 36 is swung between the arms of the frame, that portion of the belting between the arms lying against and following the contour of the testing wheel.

In the operation of that part of the invention shown in Figs. 1 and 2 the rotation of nut 21 causes the spindle 19 to rise in the cap 16 until the belting is tightly drawn beneath the wheel 28. Further rotation of the nut in the same direction results in depression of the cap and compression of the three springs 11, 12 and 13 and the upper casing section 17. By means of calibrations of any suitable character, not shown, on the section 17, and by the passing of these calibrations past the upper edge of lower casing section 14, the operator can learn at all times the number of pounds of pressure being exerted by the tester upon the belting and pulley, and consequently the tensile strength of the belting and pulley. A bolt 37 fast in the casing section 14 and traversing a slot 38 formed vertically in the section 17 prevents separation of the two casing sections when the tester is not under compression. It is to be noted that the springs 11, 12 and 13 are disposed beneath the testing wheel 28 and frame 27 and have their axes in a common plane standing at right angles to the axis of the wheel, so that the device is protected from being thrown from one side to the other by any sudden stretching of the belting at either side of the wheel, the over-all horizontal dimension of the spring assembly being as great as or greater than the horizontal span of the arms 33 of frame 27 whereby a broad base for the tester is provided in the general plane of the wheel and frame.

While I have illustrated and described the preferred embodiment of the invention, it will be obvious that one skilled in the art might make modifications thereof without departing from the spirit of the invention. I wish, therefore, not to be restricted to the precise embodiment shown, except in so far as the same is limited in the appended claims.

I claim:

1. In a testing device, the combination of a plurality of coiled springs positioned with their axes in a common plane, a cap bearing upon all of said springs, a bifurcated frame central upon said cap and spring assembly, an overhead brace, said brace adapted for carrying a wheel depending between the arms of the frame, said wheel being substantially in the plane of the axes of the springs, device whereby a strip of flexible material may be secured to and swung between the arms of the frame, and means for applying the force of all the springs to the frame in a direction toward said wheel.

2. In a testing device, the combination with elements forming a lifting jack, of a bifurcated frame mounted on the pressure head of the jack, and an overhead brace adapted for carrying an arcuate part depending between the arms of the frame.

3. In a load tester, the combination with an overhead brace, said brace adapted for carrying a wheel journaled in the brace on a horizontal axis, of elements forming a lifting jack positioned below the wheel, and a bifurcated frame mounted on the pressure head of the jack with its arms extending about the perimeter of the wheel; said jack being placed to exert force toward the frame in a direction at right angles to the axis of the wheel.

4. In a testing device, the combination with a base plate, of a central coiled spring bearing thereon, other similar springs bearing upon said plate and grouped about the central spring, a cap bearing upon said springs, an interiorly threaded nut rotatably mounted centrally upon the cap, a spindle threaded through the nut and depending through the cap into said central spring, a guiding post fixed to the base plate and projecting upwardly therefrom into a recess slidably fitting it and formed in the lower end of the spindle.

5. In a testing device, the combination with an overhead brace, said brace adapted for carrying a wheel journaled therein on a horizontal axis, of a frame below the wheel and positioned in the plane thereof, there being arms upstanding from said frame on opposite sides of the frame, and a lifting jack below said frame and supporting the same, the base of said jack being positioned in the plane of the wheel and frame and elongated in the direction of said plane.

6. A tester for pulleys, comprising in combination, an overhead brace, a pair of alined bearings mounted therein and adapted to receive a pulley and its axle between them, elements constituting a lifting jack, and apparatus for applying the force of the jack to the periphery of the pulley to be so mounted, comprising a bifurcated frame mounted on the head of the jack and embracing substantially one half of the lower periphery of the pulley, and a stout flexible belt swung between the arms of the frame and fixedly secured by its ends to said arms.

In testimony whereof I have affixed my signature.

GEORGE KAUPERT.

Copies of this patent may be obtained for five cents each, by addressing the "Commissioner of Patents, Washington, D. C."